United States Patent
Smith

(10) Patent No.: US 10,275,069 B2
(45) Date of Patent: *Apr. 30, 2019

(54) PRESSURE RESISTANT FORCE SENSING ENCLOSURE

(71) Applicant: Apple Inc., Cupertino, CA (US)

(72) Inventor: John Stephen Smith, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,343

(22) Filed: Nov. 7, 2018

(65) Prior Publication Data

US 2019/0095026 A1     Mar. 28, 2019

Related U.S. Application Data

(63) Continuation of application No. 15/712,560, filed on Sep. 22, 2017.

(51) Int. Cl.
*G06F 3/041* (2006.01)
*G06F 3/044* (2006.01)
*G02F 1/1333* (2006.01)

(52) U.S. Cl.
CPC ........ *G06F 3/0414* (2013.01); *G02F 1/13338* (2013.01); *G02F 1/133308* (2013.01); *G06F 3/044* (2013.01); *G06F 3/0412* (2013.01); *G02F 2001/133311* (2013.01); *G02F 2001/133331* (2013.01); *G06F 2203/04105* (2013.01)

(58) Field of Classification Search
CPC .................... G02F 1/1333; G02F 2001/1333
See application file for complete search history.

(56) References Cited

U.S. PATENT DOCUMENTS

| | | | |
|---|---|---|---|
| 4,267,725 | A | 5/1981 | Roth et al. |
| 6,023,033 | A | 2/2000 | Yagi et al. |
| 6,731,219 | B1 | 5/2004 | Wheat et al. |
| 7,191,662 | B2 | 3/2007 | Weber et al. |
| 8,124,900 | B2 | 2/2012 | Ruppert |
| 8,232,485 | B2 | 7/2012 | Chen et al. |
| 8,619,062 | B2 | 12/2013 | Powell et al. |
| 8,847,895 | B2 | 9/2014 | Lim et al. |
| 8,928,621 | B2 | 1/2015 | Ciesla et al. |
| 9,052,790 | B2 | 6/2015 | Yairi et al. |
| 9,063,627 | B2 | 6/2015 | Yairi et al. |

(Continued)

FOREIGN PATENT DOCUMENTS

| | | |
|---|---|---|
| CN | 103567634 | 2/2014 |
| DE | 102012009039 | 11/2013 |

(Continued)

*Primary Examiner* — Ryan A Lubit
(74) *Attorney, Agent, or Firm* — Brownstein Hyatt Farber Schreck, LLP

(57) ABSTRACT

A portable electronic device includes a cover glass, one or more strain gauges operable to indicate force exerted on the cover glass based on deformation of the cover glass, a housing that defines a sway space gap into which the cover glass deforms when the force is exerted on the cover glass, and an incompressible fluid positioned in the sway space gap. The incompressible fluid allows deformation of the cover glass into the sway space gap when the force is exerted on the cover glass and maintains a constant volume under hydrostatic pressure.

20 Claims, 10 Drawing Sheets

(56) References Cited

U.S. PATENT DOCUMENTS

| | | |
|---|---|---|
| 9,122,340 B2 | 9/2015 | Jung et al. |
| 9,477,308 B2 | 10/2016 | Ciesla et al. |
| 9,916,942 B2 | 3/2018 | Shedletsky |
| 2010/0108486 A1 | 5/2010 | Yoshida |
| 2012/0193211 A1* | 8/2012 | Ciesla .................. G06F 3/0202 200/81 H |
| 2012/0256867 A1 | 10/2012 | Annacone |
| 2014/0160063 A1* | 6/2014 | Yairi ....................... G06F 3/044 345/174 |
| 2014/0160064 A1* | 6/2014 | Yairi ................... G06F 3/04895 345/174 |
| 2015/0227205 A1* | 8/2015 | Ciesla ..................... G06F 3/016 345/173 |
| 2017/0045976 A1 | 2/2017 | Bushnell et al. |
| 2017/0090604 A1 | 3/2017 | Barbier |
| 2018/0267640 A1* | 9/2018 | Virgili ..................... G06F 3/041 |

FOREIGN PATENT DOCUMENTS

| | | |
|---|---|---|
| EP | 1983803 | 10/2008 |
| WO | WO 04/093490 | 10/2004 |
| WO | WO 07/049254 | 5/2007 |

\* cited by examiner

PRESSURE RESISTANT FORCE SENSING ENCLOSURE

CROSS-REFERENCE TO RELATED APPLICATION

This application is a continuation of U.S. patent application Ser. No. 15/712,560, filed on Sep. 22, 2017, entitled "PRESSURE RESISTANT FORCE SENSING ENCLOSURE," which is incorporated by reference in its entirety as if fully disclosed herein.

FIELD

The described embodiments relate generally to pressure-resistant force sensing enclosures. More particularly, the present embodiments concern making a touch-sensitive display that is operable to determine touch location based on detecting non-binary amounts of applied force and is resistant to hydrostatic pressure, by positioning incompressible fluid in a sway space gap.

BACKGROUND

Electronic devices may include a variety of different input and/or output components for receiving input from users and/or providing output to users. Examples of input devices include touch-sensitive displays, computer mice, keyboards, microphones, touch pads, track pads, buttons, and so on. Examples of output devices include displays, speakers, vibration actuators or other haptic output devices, and so on.

Some electronic devices may be configured to be resistant to immersion in water and/or other conditions. Such configuration may include various seals that resist liquid or other contaminants from entering the electronic device and damaging sensitive components. Such configurations may also include configuring various components of the electronic device to resist hydrostatic pressure and/or other conditions.

SUMMARY

The present disclosure relates to an electronic device incorporating one or more force and touch sensitive input layers that are operable to determine touch location based on detecting non-binary amounts of applied force, and is resistant to hydrostatic and/or other external pressure. The force and touch sensitive input layers may be operable to deform into an internal sway space gap. Strain gauges or other sensors may detect the deformation of the force and touch input layers in order to determine force exerted on the force and touch sensitive input layers. If the sway space gap were filled with air or other compressible material, external pressure could deform the force and touch sensitive input layers and/or close the sway space gap and render the force and touch sensitive input layers unable to deform under the application of force. Instead, the sway space gap may be filled with a nonconductive, incompressible fluid fill, such as silicone oil. As the fluid is incompressible, the volume in the sway space gap may always be constant. A uniform external pressure exerted on the force and touch sensitive input layer thus would not cause any motion of the force and touch sensitive input layers with respect to other components. As such, the strain gauges would not register false inputs. In this way, the force and touch sensitive input layers may be able to detect the application of force even under high hydrostatic or other external pressure. Electronic devices incorporating such force and touch sensitive input layers may be usable while subjected a variety of extreme environmental conditions, such as usable while immersed in significant depths of water or other liquid.

In some embodiments, a portable electronic device includes a touch display having a cover glass, a display layer; and a force sensor operable to indicate force exerted on the cover glass based on deformation of the cover glass. The portable electronic device further includes a housing that defines a sway space gap into which the cover glass deforms when the force is exerted on the cover glass, an incompressible fluid positioned in the sway space gap, and a processing unit that is operable to determine a location of the force on the cover glass based on an indication from the force sensor.

In various examples, the housing defines an internal volume that is filled by the incompressible fluid. In some examples, the incompressible fluid is at least one of silicone, silicone oil, a nonconductive fluid, dodecamethylpentasiloxane, a fluorocarbon, a perfluorocarbon, Perfluorodecalin, or polycyclic perfluoroalkane.

In numerous examples, the force sensor indicates strain of the cover glass. In some examples, the housing defines a sealable port operable to connect the sway space gap to an external environment. In various examples, the housing defines an air-filled interior volume outside of the sway space gap. In numerous examples, the incompressible fluid maintains a constant volume under external pressure.

In various embodiments, a portable electronic device includes a force and touch sensitive input layer, a sensor operable to indicate force exerted on the force and touch sensitive input layer based on deformation of the force and touch sensitive input layer, an incompressible material positioned in a sway space gap into which the force and touch sensitive input layer deforms when the force is exerted on the force and touch sensitive input layer, and a processor. The processor is operable to determine a location on which the force is exerted when a touch input is ignored and select an element of a user interface using the determined location.

In some examples, the incompressible material allows shifts in the force and touch sensitive input layer in order to equilibrate an internal pressure of the portable electronic device with an external pressure of an external environment. In various examples, the incompressible material is a gel.

In numerous examples, the portable electronic device further includes a vent that is operable to relieve pressure on the incompressible material. In various examples, the portable electronic device further includes a flexible enclosure that contains the incompressible material. In some examples, the portable electronic device further includes a battery wherein the force and touch sensitive input layer and the battery cooperate to define the sway space gap. In various examples, the sensor is an array of strain gauges.

In numerous embodiments, a portable electronic device includes a layer of material, a sensor operable to indicate force exerted on the layer of material based on deformation of the layer of material, a housing that defines a sway space gap into which the layer of material deforms when the force is exerted on the layer of material, and a fluid positioned in the sway space gap that allows deformation of the layer of material into the sway space gap when the force is exerted on the layer of material and maintains a constant volume under hydrostatic pressure.

In some examples, the layer of material is a component of a touch screen. In various examples, the fluid is conductive. In numerous examples, the fluid is positioned in multiple separate sections.

In various examples, the portable electronic device is operable to receive input based on a location of the force on the layer of material as determined using an indication from the sensor. In some examples, the portable electronic device further includes a processing unit that uses the sensor to determine strain.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
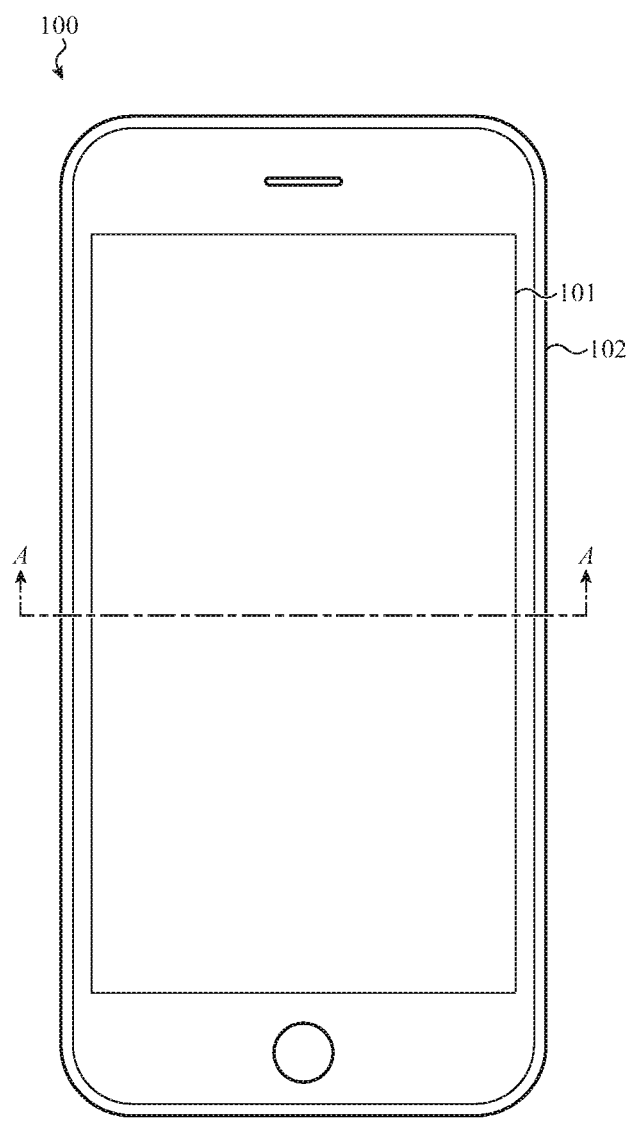
FIG. 1 depicts an electronic device with a force and touch sensitive input layer.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

Electronic devices may be configured to be resistant to immersion in water and/or other substances. For example, an electronic device may include one or more seals that prevent liquid or other contaminants from entering the electronic device by forming a barrier at gaps between components. By way of another example, various components of the electronic device may be configured to resist hydrostatic pressure and/or other external pressures.

Such electronic devices may include one or more touch and/or force sensitive input layers, such as a touch and/or force sensitive display, a touch and/or force sensitive enclosure or housing, and so on. A touch sensitive input layer may detect a location of a touch. A force sensitive input layer may detect and signal a non-binary amount of force exerted by an input. A touch and force sensitive input layer may detect both the location of a touch and the non-binary amount of force exerted by the touch. As used herein, "non-binary" means having more than two states (e.g., more than on and off, above or below a single threshold, and so on). Accordingly embodiments may measure and generate signals corresponding to, or indicating, amounts of force ranging from zero to some maximum, with at least some measurement and/or generation of signal values corresponding to/indicating forces between zero and the maximum. Typically, embodiments may measure and/or detect differences in forces on the milligram, or even microgram, scale. Signals may be generated by embodiments (such as force sensors) that distinguish between changes in force on these scales, and such signals may encompass a range of forces from zero to hundreds or thousands of grams, or more, at the stated scales.

Some touch sensitive input layers may use capacitive mechanisms that detect changes in capacitance caused by the touch of a conductive object, such as the finger of a user, a stylus, or the like. Such touch sensitive layers may not operate well (or at all) when the electronic device is immersed in water and/or other conductors even if the electronic device is waterproof or water-resistant. The presence of the water and/or other conductor on the force and touch sensitive input layer may result in the electronic device registering a constant touch across the entirety of the touch sensitive input layer, thereby disabling detection of any individual touch in an individual location.

Instead or additionally, some electronic devices may be configured to detect force associated with deformation of an input layer caused by a touch or other exertion of force on the input layer. For example, strain gauges and/or other sensors may be used to detect deformation of the input surface. The deformation may be registered on a global level (e.g., as a single input corresponding to a non-binary amount of force exerted somewhere on a surface of the input layer), or localized (e.g., the electronic device determines an area of the surface of the input layer to which an input is applied, such as by determining a centroid of input force or otherwise triangulating an input coordinate through comparing relative signals of various sensors).

Such electronic devices may include a "sway space gap." This sway space gap may be an area into which the input layer is able to deform. If the electronic device included no area into which the input layer was able to deform, the input layer would be prevented from deforming under a touch or other exertion of force on the input layer. If the input layer is prevented from deforming under a touch or other exertion of force on the input layer, the deformation of the input layer could not be detected to determine the location of a touch and/or a non-binary amount of force exerted.

However, if the sway space gap is an air gap, the deformation detection input layer may not operate properly in high-pressure environments (such as when submerged). Subjecting the electronic device to external environmental pressure exceeding one atmosphere (such as by immersion in sufficient depths of water or other conductors to subject the electronic device to hydrostatic pressure) may exert force on the touch layer. This may cause the air or other gas inside the sway space gap to compress. Compression of the air or other gas inside the sway space gap may allow the input layer to deform. As such, the deformation of the input layer caused by the external pressure may be falsely detected as a touch and/or force input. This may seriously impact use of the electronic device.

The following disclosure relates to an electronic device incorporating one or more force and touch sensitive input layers that are operable to determine touch location based on detecting non-binary amounts of applied force, and is resistant to hydrostatic and/or other external pressure. The force and touch sensitive input layers may be operable to deform into an internal sway space gap. Strain gauges or other sensors may detect the deformation of the force and touch input layers in order to determine force exerted on the force and touch sensitive input layers. If the sway space gap were filled with air or other compressible material, external pressure could deform the force and touch sensitive input layers and/or close the sway space gap and render the force and touch sensitive input layers unable to deform under the application of force. Instead, the sway space gap may be filled with a nonconductive, incompressible fluid fill, such as silicone oil. As the fluid is incompressible, the volume in the sway space gap may always be constant. A uniform external pressure exerted on the force and touch sensitive input layer thus would not cause any motion of the force and touch sensitive input layers with respect to other components. As such, the strain gauges would not register false inputs. In this way, the force and touch sensitive input layers may be able to detect the application of force even under high hydrostatic or other external pressure. Electronic devices incorporating such force and touch sensitive input layers may be usable while subjected a variety of extreme environmental conditions, such as usable while immersed in significant depths of water or other liquid.

In some implementations, local forces on a portion of the input layer causes a displacement into the sway space gap, and the volume of the electronic device is maintained by outward displacement on other sections of the electronic device or input layer, due to the hydrostatic balance of forces from the incompressible fluid.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 depicts an electronic device 100. The electronic device 100 includes a housing 102 and one or more force and touch sensitive input layers that include a cover glass 101 or other layer of material or force and touch sensitive input layer. The electronic device 100 may be operable to detect a touch to and/or an exertion of non-binary force on the cover glass by detecting deformation of the cover glass 101.

Figure 2A:
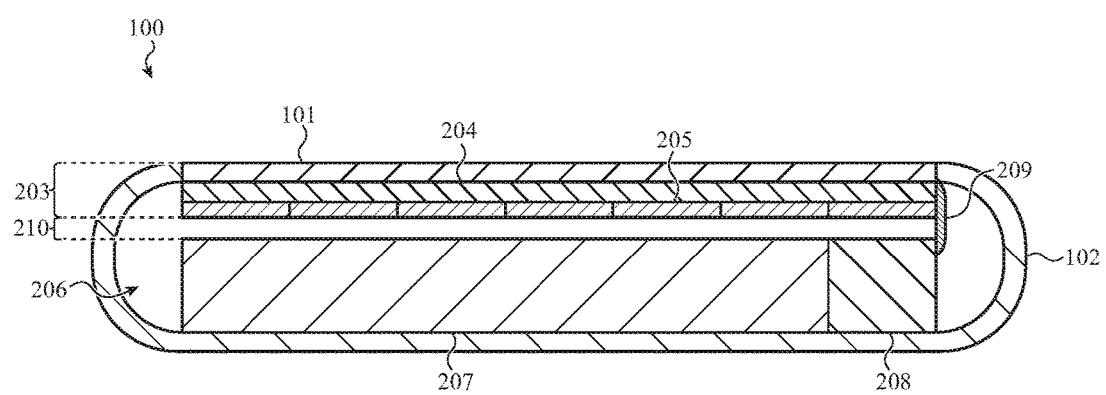
FIG. 2A is a cross-sectional view of a first embodiment of the electronic device of FIG. 1, taken along line A-A of FIG. 1.

FIG. 2A is a cross-sectional view of a first embodiment of the electronic device 100 of FIG. 1, taken along line A-A of FIG. 1. In this first embodiment, the electronic device 100 includes a force and touch sensitive input layer 203. Although the force and touch sensitive input layer 203 is described as a single layer, it is understood that the force and touch sensitive input layer 203 may include a number of different layers. For example, in some implementations, different layers may be used to detect touch and force. In various implementations, such layers may be located together, separated, and/or be otherwise configured.

The force and touch sensitive input layer 203 may include the cover glass 101, a display layer 204 (such as a light emitting diode display, an organic light emitting diode display, and so on), and an array of strain gauges 205 or other sensors (such as other strain sensors, capacitive sensors, optical sensors, thermoelectric sensors, and so on that may be used to detect touch, force, or both). The housing 102 defines an air-filled (and/or other gas) interior or internal volume 206. The electronic device 100 also includes one or more additional components, such as a battery 207 and a processing unit 208 or other processor or controller that is electrically connected to the display layer 204 and/or the strain gauges 205 via a flex circuit 209 and/or other connector.

Figure 2B:
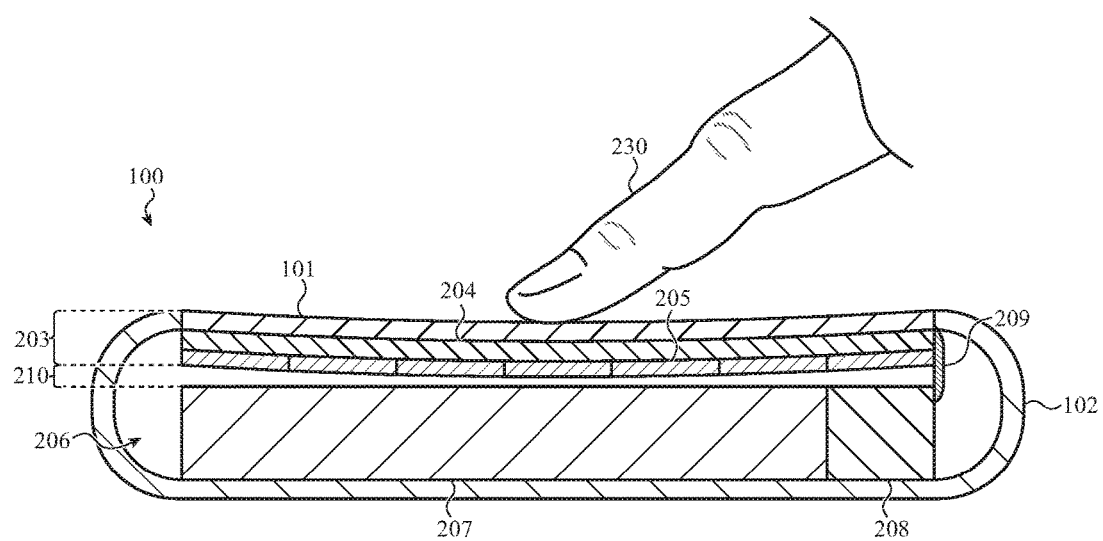
FIG. 2B illustrates the example electronic device of FIG. 2A when force is exerted on a location of the cover glass.

The force and touch sensitive input layer 203 and the battery 207 and/or the processing unit 208 may cooperatively define a sway space gap 210 between each other. Various components of the force and touch sensitive input layer 203 (such as the cover glass 101) may be operable to deform into the sway space gap 210 when force is exerted on the cover glass 101. For example, FIG. 2B illustrates the example electronic device 100 of FIG. 2A when force is exerted by an object 230 on a location of the cover glass 101. As a result, the cover glass 101 and/or other components of the force and touch sensitive input layer 203 may deform into the sway space gap 210. The processing unit 208 may determine that one or more of the strain gauges 205 indicate strain or other deformation data (such as in implementations where deformation data includes changes in capacitance of capacitive elements positioned on either side of the sway space gap 210). This strain data may indicate force exerted on the cover glass 101 based on the deformation of the cover glass 101. The processing unit 208 may evaluate the deformation data to detect one or more touches, one or more touch locations, one or more non-binary amounts of force exerted by one or more touches, and so on.

Figure 2C:
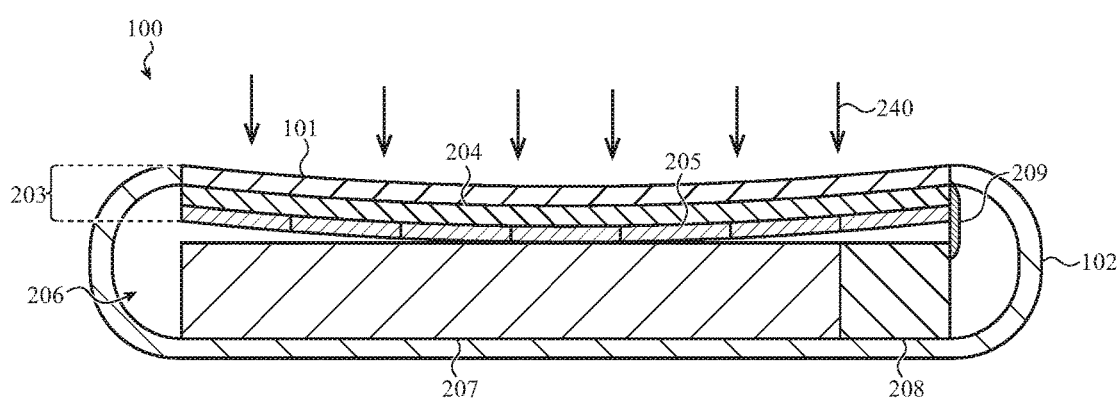
FIG. 2C illustrates the example electronic device of FIG. 2A when subjected to hydrostatic pressure.

However, because the internal volume 206 and/or the sway space gap 210 is filled with a compressible material such as air and/or other gases, hydrostatic and/or other external pressure may interfere with the operation of the above discussed mechanism. For example, FIG. 2C illustrates the example electronic device 100 of FIG. 2A when subjected to hydrostatic pressure 240. In this example, the hydrostatic pressure 240 uniformly exerts force on the cover glass 101. The air or other gas filling the internal volume 206 and/or the sway space gap 210 may compress, allowing the cover glass 101 and/or other components of the force and touch sensitive input layer 203 may deform into the sway space gap 210. The air or other gas may have to compress because the hydrostatic pressure 240 may be uniformly exerted across the cover glass 101 and the housing 102. This may mean that the air or other gas cannot deform the housing 102 outward and can only reduce the volume of the air or other gas in response to the external pressure. The housing 102 may be sufficiently rigid so that the cover glass 101 and/or other components of the force and touch sensitive input layer 203 deforms inward rather than the housing. As a result, the deformation data related to the deformation of the cover glass 101 and/or other components of the force and touch sensitive input layer 203 may cause the processing unit 208 to falsely detect input based on the deformation data from the strain gauges 205. Further, the deformation of the cover glass 101 may be the maximum amount of deformation that the strain gauges 205 are operable to detect so that actual touch or force input to the cover glass 101 is not detectable because the strain gauges 205 are unable to signal any additional deformation of the cover glass 101.

Figure 3:
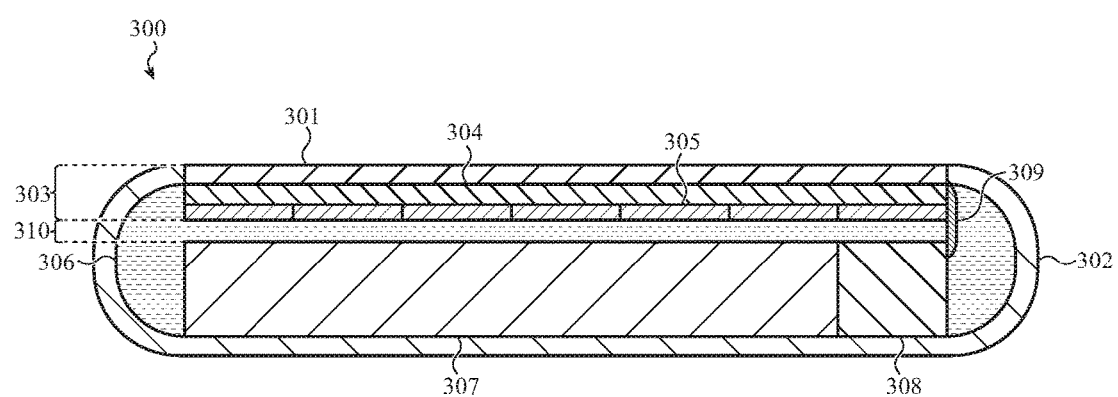
FIG. 3 illustrates a second embodiment of the electronic device of FIG. 1, taken along line A-A of FIG. 1.

FIG. 3 illustrates a second embodiment of the electronic device 100 of FIG. 1, taken along line A-A of FIG. 1. Similar to the first embodiment of FIG. 2A, the electronic device 300 may have a housing 302; a force and touch sensitive input layer 303 including a cover glass 301, a display layer 304, and an array of strain gauges 305 or other strain sensors; and additional components, such as a battery 307 and a processing unit 308 electrically connected to the display layer 304 and/or the strain gauges 305 via a flex 309. In contrast with the first embodiment of FIG. 2A, a sway space gap 310 and/or an internal volume of the housing 302 of the electronic device 300 may be filled with an incompressible fluid 306 or liquid.

The incompressible fluid 306 may allow the cover glass 301 and/or other components of the force and touch sensitive input layer 303 to deform into the sway space gap 310 when a localized force is exerted on the cover glass 301, for example as a result of a touch. However, because the incompressible fluid 306 is incompressible, a volume of the sway space gap 310 may remain constant under hydrostatic and/or other external pressure that is uniform across the electronic device 300. As a result, the cover glass 301 and/or other components of the force and touch sensitive input layer 303 may not deform when the electronic device 300 is subjected to hydrostatic and/or other external pressures that are uniform across the electronic device 300. The force and touch sensitive input layer 303 may thus be able still operate (i.e., detect input and/or perform other operations) even when the electronic device 300 is subjected a variety of extreme conditions, such as immersion in significant depths of water (such as over ten feet).

The incompressible fluid 306 may be any kind of liquid and/or other material that is incompressible and allows the cover glass 301 and/or other components of the force and touch sensitive input layer 303 to deform into the sway space gap 310 when force is exerted on the cover glass 301 related to a touch. Examples of such materials may include silicone, silicone oil, a gel, a silicone gel, dodecamethylpentasiloxane, fluorocarbons (including engineered fluorocarbons such as 3M™ Novec™ engineered fluids like 3M™ Novec™ 7600, 3M™ Fluorinert™, and so on), perfluorocarbons, Perfluorodecalin, polycyclic perfluoroalkane, and so on. The incompressible fluid 306 may allow the incompressible material allows shifts in the cover glass 301 and/or other components of the force and touch sensitive input layer 303 in order to equilibrate an internal pressure of the electronic device 300 with an external pressure of an external environment.

In some implementations, the incompressible fluid 306 may be a nonconductive fluid to prevent damage to other components, such as the battery 307, the processing unit 308, and so on. Using a nonconductive fluid may prevent the fluid from shorting components, such as the battery 307, the processing unit 308, the strain gauges 305, and so on. In numerous implementations, one or more capacitors formed by capacitive elements positioned on either side of the sway space gap 310 may be used instead of and/or in addition to the strain gauges 305. In such an implementation, using a nonconductive fluid may prevent the fluid from interfering with the capacitor(s). This, along with the constant volume maintained by the incompressible fluid 306, may allow such capacitor(s) to be used to detect deformation of the cover glass 101 when the electronic device 300 is immersed in nonconductive liquids. In various implementations, the incompressible fluid 306 may be blocked from other components by one or more barriers and/or the other components may include one or more seals to block entry of the incompressible fluid 306.

The processing unit 308 may be configured to use strain data from the strain gauges 305 and/or data from other components to determine various touch events, such as detection of one or more touches to the cover glass 301, locations of one or more touches, non-binary amounts of one or more forced exerted by one or more touches, and so on. In some examples, the cover glass 301 and/or other components of the force and touch sensitive input layer 303 may deform differently under different hydrostatic and/or other external pressures and the processing unit 308 may weight and/or otherwise process the received data as part of determining detected input. In various examples, the display layer 304 may be a capacitive sensing display (and/or the force and touch sensitive input layer 303 may otherwise include capacitive sensing elements) and the processing unit 308 may be able to decide whether to use the strain gauges 305 or the capacitive sensing elements to determine detected input, may use a combination of the strain gauges 305 and the capacitive sensing elements to determine detected input, and so on.

Though not specifically shown in FIG. 3, it is understood that the electronic device 300 may include one or more seals that block entry of liquid and/or other contaminants into the electronic device 300. For example, such a seal may be positioned between the cover glass 301 and the housing 302.

The electronic device 300 may include various components not shown. These components may include one or more non-transitory storage media (which may take the form of, but is not limited to, a magnetic storage medium; optical storage medium; magneto-optical storage medium; read only memory; random access memory; erasable programmable memory; flash memory; and so on), midplates, barometers, cameras, speakers, microphones, and so on. In various examples, these components (such as a camera, speaker, microphone, and so on) may be configured to operate compatibly with the incompressible fluid 306 instead of air and/or other gases.

The incompressible fluid 306 may allow deformation of the cover glass 301 and/or other components of the force and touch sensitive input layer 303 into the sway space gap 310 the same way that air or other gases would. As such, strain determinable from the strain gauges 305 may be unaffected by whether the incompressible fluid 306 or air or other gases is positioned in the sway space gap 310. However, in some implementations, the incompressible fluid 306 may allow deformation of the cover glass 301 and/or other components of the force and touch sensitive input layer 303 into the sway space gap 310 differently than air or other gases would. In such implementations, the processing unit 308 may interpret sensor data obtained from the strain gauges 305 in a way that accounts for this difference in order to make accurate determinations regarding touch, touch location, non-binary amounts of force exerted, and so on.

Although the incompressible fluid 306 is described as a liquid, it is understood that this is an example. In various implementations, the incompressible fluid 306 may instead be an incompressible (but locally deformable) solid. For example, in some implementations, an incompressible and locally deformable gel may be used.

Although the electronic device 100, 300 is illustrated as a smart phone, it is understood that this is an example. In numerous implementations, the electronic device 100, 300 may be any kind of device without departing from the scope of the present disclosure. Examples of such devices include, but are not limited to, a desktop computing device, a portable electronic device, a cellular telephone, a digital media player, a laptop computing device, a tablet computing device, a wearable device, a mobile computing device, a kitchen appliance, a display, a track pad, a keyboard, a touch pad, and so on.

Although the electronic device 100, 300 is illustrated and described as including a force and touch sensitive input layer 203, 303 that has a particular configuration, such as including a cover glass 101, 301 or other layer of material, it is understood that this is an example. In various implementations, the techniques discussed herein may be used with any kind of force and touch sensitive input layer without departing from the scope of the present disclosure. Other configurations are possible and contemplated. For example, in some implementations, the input layer may be an opaque portion of a metal or plastic housing that is configured to deform into an interior sway space gap in order to provide input.

In one example, the force and touch sensitive input layer 203 may include a capacitive sensing layer. The processing unit 308 or other processor may be operable to determine the location of a touch input to the cover glass 301 using one or more touch input indications from the capacitive sensing layer and/or force exerted on the cover glass 301 using one or more force indications using the strain gauges 305. The processing unit 308 may be operable to present a user interface using the display layer 304 and to select and/or otherwise manipulate elements of the user interface based on the touch input determined using the capacitive sensing layer. If the electronic device 300 is immersed in water or another conductor, the capacitive sensing layer may indicate a constant touch input across the entirety of the cover glass 301. In such a situation, the processing unit 308 may be operable to determine to ignore the touch input, determine a location of the cover glass 301 on which the force is exerted when the touch input is ignored, and select an element of the user interface using the determined location. Various configurations are possible and contemplated without departing from the scope of the present disclosure.

Figure 4:
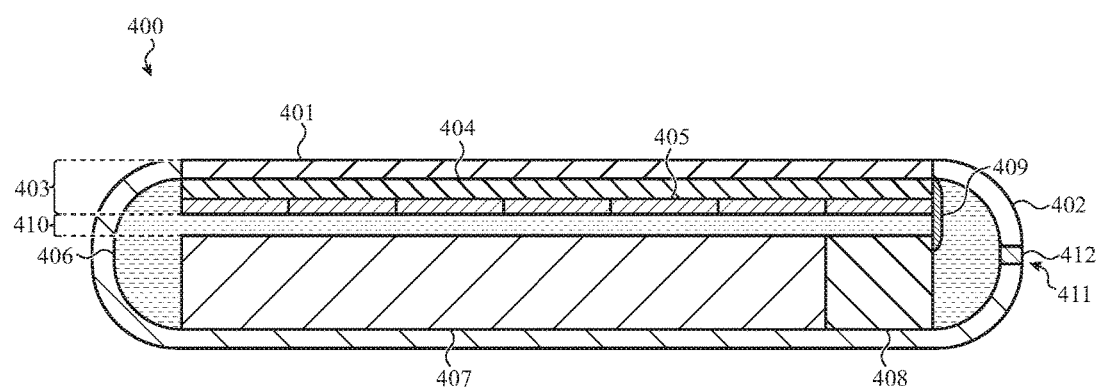
FIG. 4 illustrates a first alternative implementation of the electronic device of FIG. 3.

By way of another example, FIG. 4 illustrates a first alternative implementation of the electronic device 300 of FIG. 3. In this first alternative implementation, the electronic device 400 may define a vent 411 and/or other sealable aperture that is operable to connect the sway space gap 410 to an external environment. The vent 411 may be defined in the housing 402, and/or in another component such as the cover glass 401.

In some implementations, as shown the vent 411 may be sealed by a plug 412 that may be removable. For example, the plug 412 may be removed in order to allow incompressible fluid 406 or liquid (which may be nonconductive so as not to short internal components) to be added and/or to allow some of the incompressible fluid 406 to be removed.

In some implementations, the vent 411 may be used to fill the housing 402 with the incompressible fluid 406. For example, the plug 412 may not yet be positioned in the vent 411 and the electronic device 400 may be immersed in the incompressible fluid 406. The incompressible fluid 406 may enter the housing 402 through the vent 411. Pressure may be used to force the incompressible fluid 406 inside, and the pressure may be cycled until air bubbles have been removed and the incompressible fluid 406 fill is complete. The plug 412 may then be placed into the vent 411 to block exit of the incompressible fluid 406.

A similar procedure may be used should a seal be damaged, allowing for the exit of some of the incompressible fluid 406. For example, the seal may be repaired, the plug 412 may be removed, incompressible fluid 406 may be added, and the plug 412 may then be reinserted into the vent 411.

In various implementations, the vent 411 may be configured to be sealable in other ways other than use of the plug 412. In such implementations, the plug 412 may be omitted.

In numerous implementations, the vent 411 may perform other functions. For example, the vent 411 may be operable to equalize internal pressure within the electronic device 400 with external pressure of an external environment. As such, the vent 411 may be operable to relieve pressure on the incompressible fluid 406. In some implementations, the vent 411 may be operable to release internal pressure if internal pressure exceeds external pressure. For example, the battery 407 may expand. This may cause internal pressure to rise. To accommodate the increase in the size of the battery 407, some of the incompressible fluid 406 may be removed through the vent 411. In some implementations, this may be automatic, caused by the internal pressure exceeding a threshold of the vent 411. In other implementations, this may be a manual or other operation resulting from manipulation of the vent 411 in response to degraded operation of the force and touch sensitive input layer 403, an indication provided regarding internal pressure or an expansion state of the battery 407, and so on.

Returning to FIG. 3, although the incompressible fluid 306 is illustrated and described as filling the electronic device 300 so that air or other gas may not remain, it is understood that this is an example. In various implementations, air or other gas may fill a portion of an internal volume of the electronic device 300 outside of the sway space gap 310 (and/or within a portion of the sway space gap 310 without filing the entire sway space gap 310) without departing from the scope of the present disclosure.

Figure 5:
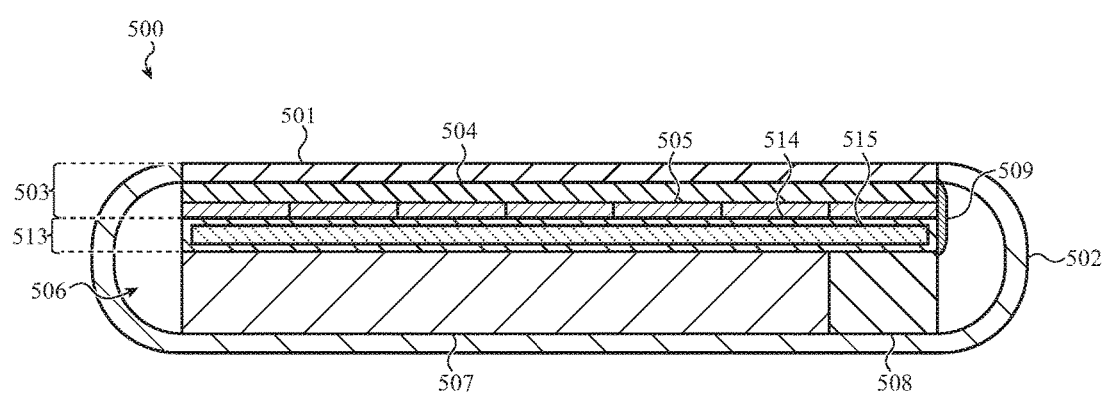
FIG. 5 illustrates a second alternative implementation of the electronic device of FIG. 3.

For example, FIG. 5 illustrates a second alternative implementation of the electronic device 300 of FIG. 3. In this second alternative implementation, the electronic device 500 includes incompressible member 513 positioned in a space (i.e., sway space gap) defined between a force and touch sensitive input layer 503 and/or components thereof and other components such a battery 507 and/or a processing unit 508. The incompressible member 513 may include a flexible enclosure 514 (such as flexible plastic and so on) that contains an incompressible fluid 515 or liquid and/or other incompressible material. In this way, air or other gas may fill an interior or internal volume 506 while the incompressible member 513 maintains a constant volume. This air-filled internal volume may contribute to the buoyancy of the electronic device 500 without impairing the operation of the force and touch sensitive input layer 503 when the electronic device 300 is subjected to hydrostatic or other external pressure.

Additionally, as the flexible enclosure 514 separates the incompressible fluid 515 from internal components, the incompressible fluid 515 may be conductive without shorting and/or otherwise damaging internal components. In various implementations, the incompressible fluid 515 may be either conductive or nonconductive.

Although FIG. 5 illustrates and describes the incompressible fluid 515 as contained within a single section, it is understood that this is an example. In various implementations, the incompressible fluid 515 may be disposed within any number of separate sections without departing from the scope of the present disclosure. For example, in some implementations, a deformable separator may separate different sections of the incompressible fluid 515 from each other. Such separators may themselves be incompressible, or may be compressible but may not allow any sway space gap between the force and touch sensitive input layer 503 and/or components thereof and other components as the multiple sections of the incompressible fluid 515 may still maintain the volume of the space despite hydrostatic and/or other external pressure.

In various implementations of electronic devices similar to those discussed above with respect to FIGS. 3-5, the housing may include a bellows or deformable membrane section separating the interior and exterior of the housing which allows changes in volume due to expansion of the battery, incompressible fluid, or other internal elements. In some implementations, this may be a flat plate which is allowed to bulge as the internal volume of the battery increases. In other implementations, a slight bulging of the cover glass may be tolerated if and when the battery expands as it ages.

Figure 6:
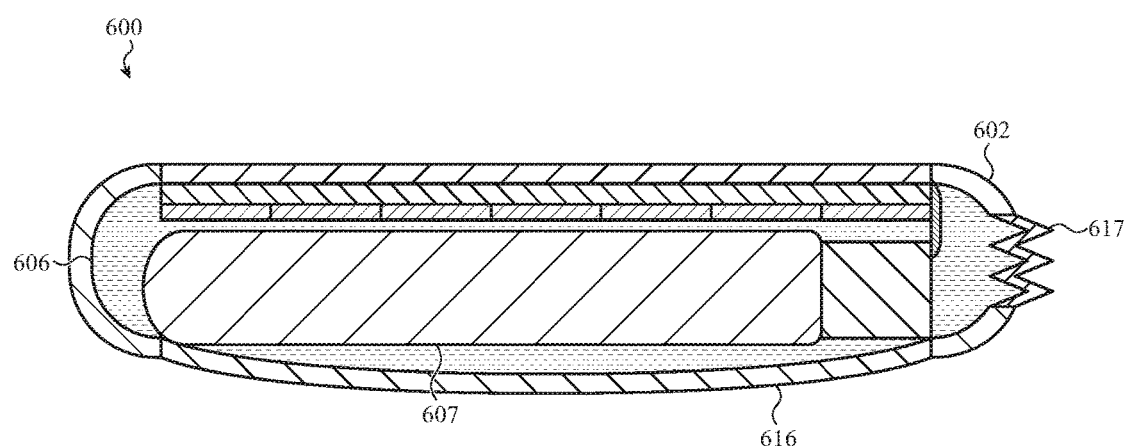
FIG. 6 illustrates a third alternative implementation of the electronic device of FIG. 3.

For example, FIG. 6 illustrates an electronic device 600 including a flat plate 616 and a bellows 617 coupled to a housing 602. As shown, expansion of the battery 607 exerts pressure on the incompressible fluid 606, causing the flat plate 616 to bulge and the bellows 617 to expand.

Figure 7:
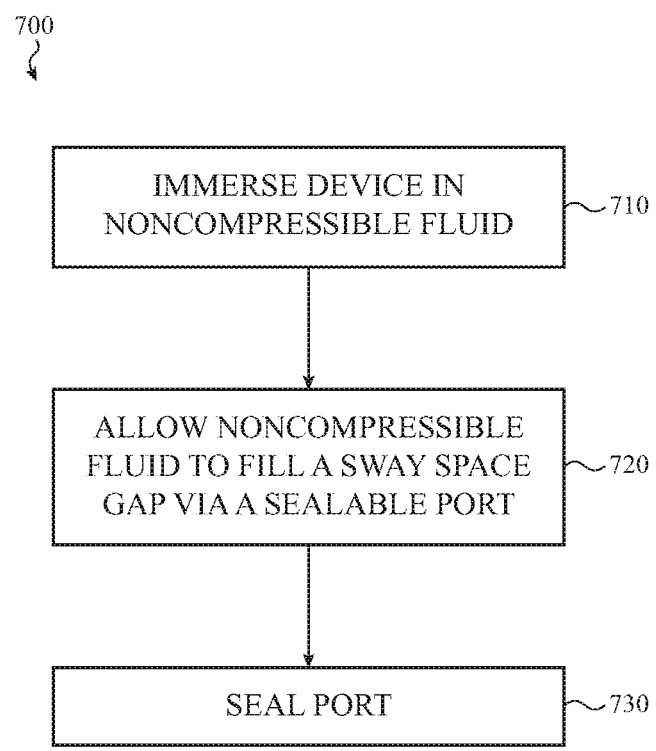
FIG. 7 illustrates an example method for making an electronic device having a force sensing surface pressure resistor.

FIG. 7 illustrates an example method 700 for making an electronic device having a touch and force sensing layer pressure resistor. Such an electronic device may be one or more of the electronic devices 300, 400, 500, 600 of FIGS. 3-6.

At 710, the device may be immersed in an incompressible fluid. At 720, the incompressible fluid may be allowed to fill a sway space gap in the device via a sealable port in the device. At 730, the port may be sealed.

Although the example method 700 is illustrated and described as including particular operations performed in a particular order, it is understood that this is an example. In various implementations, various orders of the same, similar, and/or different operations may be performed without departing from the scope of the present disclosure.

For example, in some implementations, the example method 700 may be used to adjust an electronic device that has a pressure resistant force sensing touch and force sensing layer and has sustained damage to one or more seals that block egress of incompressible fluid. In such implementations, the example method 700 may include the additional operation of repairing the seals. Such an operation may be performed prior to 710, after 720 and prior to 730, and so on. Various arrangements are possible and contemplated.

Figure 8:
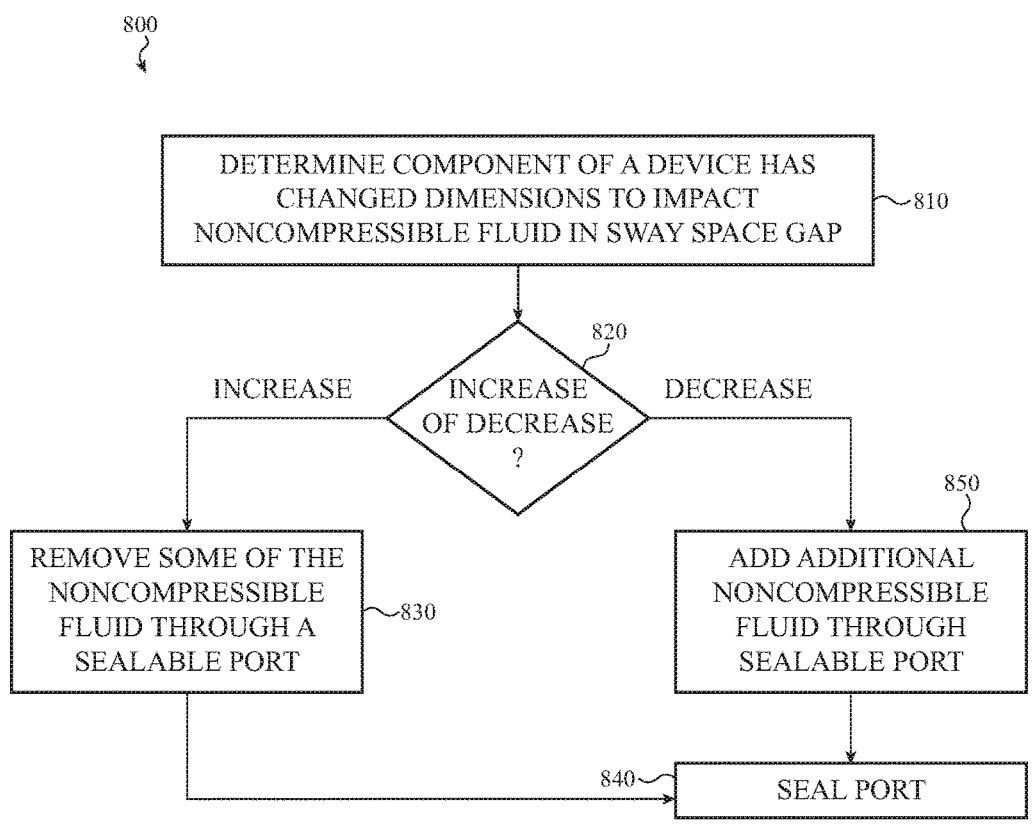
FIG. 8 illustrates an example method for adjusting a pressure resistant electronic device having a force sensing surface.

FIG. 8 illustrates an example method for adjusting a pressure resistant electronic device having a force sensing touch and force sensing layer. Such an electronic device may be one or more of the electronic devices 300, 400, 500, 600 of FIGS. 3-6.

At 810, it may be determined that a component of the device has changed dimensions to impact incompressible fluid in a sway space gap inside the device. At 820, it may be determined whether the changed dimensions involve an increase or a decrease. If the changed dimensions involve an increase, the flow may proceed to 830. Otherwise, the flow may proceed to 850.

At 830, after it is determined that the changed dimensions involve an increase, some of the incompressible fluid may be removed through the sealable port. The flow may then proceed to 840 where the port may be sealed.

At 850, after it is determined that the changed dimensions involve a decrease, additional incompressible fluid may be added through the sealable port. The flow may then proceed to 840 where the port may be sealed.

Although the example method 800 is illustrated and described as including particular operations performed in a particular order, it is understood that this is an example. In various implementations, various orders of the same, similar, and/or different operations may be performed without departing from the scope of the present disclosure.

For example, the example method 800 may include the additional operation of unsealing the port before some of the incompressible fluid is removed at 830. Additionally or alternatively, the example method 800 may include the operation of unsealing the port before additional incompressible fluid is added at 850. Various arrangements are possible and contemplated.

As described above and illustrated in the accompanying figures, the present disclosure relates to an electronic device incorporating one or more force and touch sensitive input layers that are operable to determine touch location based on detecting non-binary amounts of applied force, and is resistant to hydrostatic and/or other external pressure. The force and touch sensitive input layers may be operable to deform into an internal sway space gap. Strain gauges or other sensors may detect the deformation of the force and touch input layers in order to determine force exerted on the force and touch sensitive input layers. If the sway space gap were filled with air or other compressible material, external pressure could deform the force and touch sensitive input layers and/or close the sway space gap and render the force and touch sensitive input layers unable to deform under the application of force. Instead, the sway space gap may be filled with a nonconductive, incompressible fluid fill, such as silicone oil. As the fluid is incompressible, the volume in the sway space gap may always be constant. A uniform external pressure exerted on the force and touch sensitive input layer thus would not cause any motion of the force and touch sensitive input layers with respect to other components. As such, the strain gauges would not register false inputs. In this way, the force and touch sensitive input layers may be able to detect the application of force even under high hydrostatic or other external pressure. Electronic devices incorporating such force and touch sensitive input layers may be usable while subjected a variety of extreme environmental conditions, such as usable while immersed in significant depths of water or other liquid.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable electronic device, comprising:
   a touch display comprising:
     a cover glass;
     a display layer; and
     a force sensor operable to indicate force exerted on the cover glass based on deformation of the cover glass;
   a housing that defines a gap beneath the display layer and the force sensor into which the cover glass deforms when the force is exerted on the cover glass;
   an incompressible fluid positioned in the gap; and
   a processing unit that is operable to determine a location of the force on the cover glass based on an indication from the force sensor.

2. The portable electronic device of claim 1, wherein the housing defines an internal volume that is filled by the incompressible fluid.

3. The portable electronic device of claim 1, wherein the incompressible fluid comprises at least one of:
   silicone;
   silicone oil;
   a nonconductive fluid;
   dodecamethylpentasiloxane;
   a fluorocarbon;
   a perfluorocarbon;
   Perfluorodecalin; or
   polycyclic perfluoroalkane.

4. The portable electronic device of claim 1, wherein the force sensor indicates strain of the cover glass.

5. The portable electronic device of claim 1, wherein the housing defines an air-filled interior volume outside of the gap.

6. The portable electronic device of claim 1, wherein the housing defines a sealable port operable to connect the gap to an external environment.

7. The portable electronic device of claim 1, wherein the incompressible fluid maintains a constant volume under external pressure.

8. A portable electronic device, comprising:
   a force and touch sensitive input layer;
   a sensor operable to indicate force exerted on the force and touch sensitive input layer based on deformation of the force and touch sensitive input layer;
   an incompressible material positioned in a gap beneath the sensor and the force and touch sensitive input layer into which the force and touch sensitive input layer deforms when the force is exerted on the force and touch sensitive input layer; and
   a processor operable to:
      determine a location on which the force is exerted when a touch input is ignored; and
      select an element of a user interface using the determined location.

9. The portable electronic device of claim 8, wherein the incompressible material allows shifts in the force and touch sensitive input layer in order to equilibrate an internal pressure of the portable electronic device with an external pressure of an external environment.

10. The portable electronic device of claim 8, further comprising a vent that is operable to relieve pressure on the incompressible material.

11. The portable electronic device of claim 8, further comprising a flexible enclosure that contains the incompressible material.

12. The portable electronic device of claim 8, wherein the incompressible material comprises a gel.

13. The portable electronic device of claim 8, further comprising a battery; wherein
   the force and touch sensitive input layer and the battery cooperate to define the gap.

14. The portable electronic device of claim 8, wherein the sensor comprises an array of strain gauges.

15. A portable electronic device, comprising:
   a layer of material;
   a sensor operable to indicate force exerted on the layer of material based on deformation of the layer of material;
   a housing that defines a gap beneath the layer of material and the sensor into which the layer of material deforms when the force is exerted on the layer of material; and
   an incompressible fluid positioned in the gap that allows deformation of the layer of material into the gap when the force is exerted on the layer of material and maintains a constant volume under hydrostatic pressure; wherein
   the portable electronic device is operable to receive input based on a location of the force on the layer of material as determined using an indication from the sensor.

16. The portable electronic device of claim 15, wherein the layer of material is a component of a touch screen.

17. The portable electronic device of claim 15, wherein the incompressible fluid is conductive.

18. The portable electronic device of claim 15, wherein the incompressible fluid is positioned in multiple separate sections.

19. The portable electronic device of claim 15, wherein the portable electronic device is operable to receive the input while immersed in a liquid.

20. The portable electronic device of claim 15, further comprising a processing unit that uses the sensor to determine strain.

* * * * *